(12) United States Patent
Urai

(10) Patent No.: US 6,529,352 B1
(45) Date of Patent: Mar. 4, 2003

(54) MAGNETORESISTIVE SENSING ELEMENT AND MAGNETIC HEAD USING THE MAGNETORESISTIVE SENSING ELEMENT

(75) Inventor: Haruo Urai, Tokyo (JP)

(73) Assignee: NEC Corporation, Tokyo (JP)

( * ) Notice: Subject to any disclaimer, the term of this patent is extended or adjusted under 35 U.S.C. 154(b) by 711 days.

(21) Appl. No.: 08/855,279

(22) Filed: May 13, 1997

(30) Foreign Application Priority Data

May 13, 1996 (JP) .............................................. 8-117790

(51) Int. Cl.[7] .............................................. G11B 5/127
(52) U.S. Cl. ...................................................... 360/313
(58) Field of Search ................................. 360/113, 313, 360/126, 121; 324/207.21

(56) References Cited

U.S. PATENT DOCUMENTS

| | | | | |
|---|---|---|---|---|
| 4,814,921 A | * | 3/1989 | Hamakawa et al. | 360/126 |
| 5,528,440 A | * | 6/1996 | Fontana et al. | 360/113 |
| 5,574,367 A | * | 11/1996 | Logue | 324/207.26 |
| 5,650,887 A | * | 7/1997 | Dovek et al. | 360/113 |
| 5,669,133 A | * | 9/1997 | George | 360/113 |

FOREIGN PATENT DOCUMENTS

| | | |
|---|---|---|
| JP | 04 19809 | 1/1992 |
| JP | 08203032 | 8/1996 |
| JP | 08297814 | 11/1996 |

* cited by examiner

*Primary Examiner*—Allen Cao
(74) *Attorney, Agent, or Firm*—Sughrue Mion, PLLC

(57) ABSTRACT

The present invention is intended to improve the linear response characteristics of resistance changes to the magnetic field. According to the present invention, an MR sensing element 10 comprises a sensing pattern 12 consisting of a magnetoresistive layer whose resistance changes in accordance with the direction of magnetization M, and an electrode layer for applying a sense current J to the sensing pattern 12. The sensing pattern 12 is formed to be of circular shape. According to the present invention, since the demagnetic field within the sensing pattern is made constant with respect to the direction of the magnetization M, the improved linear response characteristics of resistance changes to an external magnetic field Hs can be realized.

10 Claims, 6 Drawing Sheets

MAGNETORESISTIVE SENSING ELEMENT AND MAGNETIC HEAD USING THE MAGNETORESISTIVE SENSING ELEMENT

BACKGROUND OF THE INVENTION

1. Field of the Invention

The present invention relates to a magnetoresistive (to be referred to as MR hereinafter) element whose direct current resistance changes in accordance with a magnetic field, and to a magnetic head using the MR element.

2. Description of the Related Art

It is typically necessary for a magnetic disk apparatus to comprise a magnetic recording medium for recording magnetic information and a magnetic head for detecting a magnetic field generated from the magnetic information in the magnetic recording medium. In the conventional magnetic head, a sensing electromagnetic inductive element for detecting the magnetic field has been widely used. Such an electromagnetic inductive type sensing element which is, however signals, low in the output voltage of reproducing magnetic recording, has been disadvantageously unsuited for high-density recording.

To overcome the disadvantage, an MR type magnetic head using an MR sensing element was invented and has lately been put to practical use.

FIGS. 10 and 11 show a conventional MR sensing element. Specifically, FIG. 10 is a plan view showing the constitution of the conventional MR sensing element. FIG. 11 is a graph showing resistance vs. magnetic field transfer curve for magnetoresistance characteristics. Description will now be given to the prior art with reference to FIGS. 10 and 11.

A conventional MR sensing element 79 comprises a sensing pattern 80 consisting of a magnetoresistive layer whose resistance changes in accordance with the direction between magnetization M applied sense current J to the sensing pattern 80. The sensing pattern 80 is made of, for example, an NiFe alloy thin layer and is of rectangular shape. The sensing pattern 80 is constructed such that effective anisotropy is oriented parallel to the longer side of the rectangle and that in order to provide the linear response characteristics of resistance changes to an external field Hs, a bias field is applied to the sensing pattern 80 in advance and the magnetization M within the sensing pattern 80 thereby forms approximately 45° with the sense current J when Hs=0. On both sides of the sensing pattern 80, domain stabilizing layers 82, 82 are provided for making the magnetic domain structure of the sensing pattern 80 a single domain.

When the external field Hs is applied, the magnetization M of the sensing pattern 80 rotates in accordance with the magnitude of Hs. The resistance of the sensing pattern 80 then changes in accordance with an angle q of the magnetization M to the sense current J as shown in FIG. 11. In case that the external field Hs is the magnetic field of a signal from a magnetic recording medium, a high sensitivity magnetic head can be realized by electrically detecting resistance changes.

The conventional MR sensing element 79 has the sensing pattern 80 of rectangular shape. In such a sensing pattern having sides with different lengths, the demagnetic field within the pattern is not constant with respect to the direction of the magnetization M. In order words, the magnitude of the demagnetic field is small in the long axis direction and large in the short axis direction. Due to this, as shown in FIG. 11, the magnetoresistance to the external field Hs show transfer curve having a flexion 84. Thus, the linear response characteristics of resistance changes to the magnetic field is disadvantageously low.

SUMMARY OF THE INVENTION

It is therefore the object of the present invention to provide an MR sensing element with the improved linear response characteristic of resistance changes to the magnetic field, and a magnetic head using the MR sensing element.

The magnetoresistive sensing element according to the present invention comprises:

a sensing pattern consisting of a magnetoresistive layer whose resistance changes in accordance with the direction of magnetization; and an electrode layer for applying a sense current to the sensing pattern, wherein the sensing pattern is formed to be of substantially circular shape.

The magnetoresistive sensing element according to the present invention further comprises a domain stabilizing layer for making the magnetic domain structure of the sensing pattern a single magnetic domain, wherein the domain stabilizing layer is provided on each side of the sensing pattern and the electrode layer is formed on the domain stabilizing layer.

This arrangement permits the demagnetic field within the sensing pattern to be constant with respect to the magnetization direction and can thereby provide the improved linear response characteristics of resistance changes to the external field.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 1:
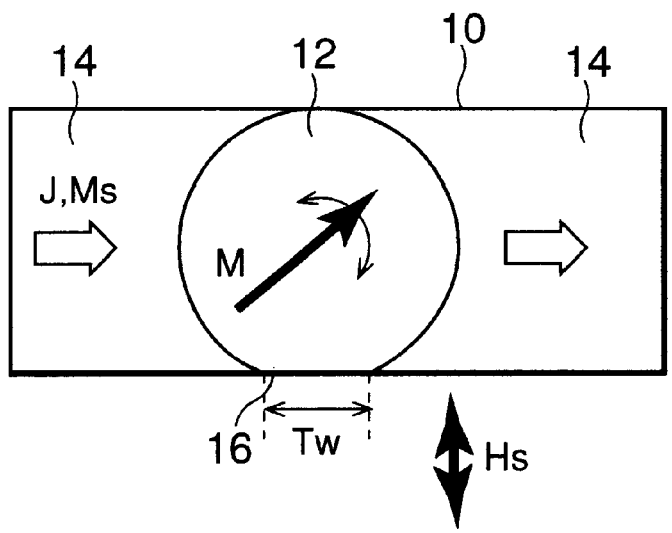
FIG. 1 is a plan view showing the structure of an MR sensing element of a first embodiment according to the present invention.
Figure 2:
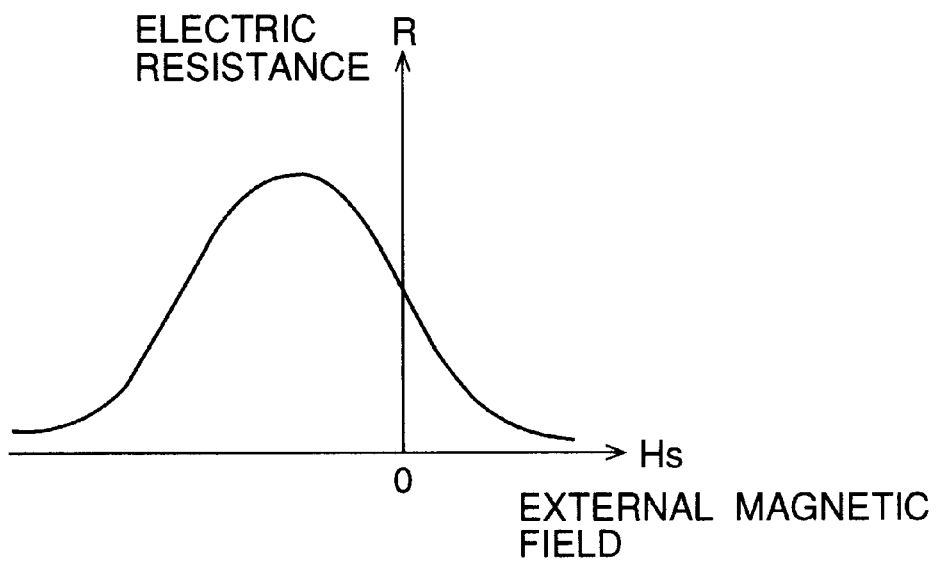
FIG. 2 is a graph showing the magnetoresistance transfer curve of the MR sensing element shown in FIG. 1.

FIGS. 1 and 2 show an MR sensing element of a first embodiment according to the present invention. Specifically, FIG. 1 is a plan view showing the constitution of the MR sensing element. FIG. 2 is a graph showing magnetoresistance characteristics. Description will be given to the first embodiment with reference to FIGS. 1 and 2.

In this embodiment, an MR sensing element 10 comprises a sensing pattern 12 consisting of a magnetoresistive layer whose resistance changes in accordance with the direction between magnetization M and applied sense current J to the sensing pattern 12. The sensing pattern 12 is formed to be of circular shape.

The sensing pattern 12 is manufactured by, for example, the following steps. An NiFe layer having a thickness of 20 nm is deposited on a substrate by a sputtering technique. The NiFe layer is processed to be of circular shape by a photolithography technique. The sensing pattern 12 is ion-milled to a circle having a diameter of 6 $\mu$m at a chord 16 having a length Tw=2 $\mu$m. The surface perpendicular to a surface including the chord 16 is ABS surface.

On both sides of the sensing pattern 12, domain stabilizing layers 14, 14 are provided for making the magnetic domain structure of the sensing pattern 12 a single magnetic domain. The domain stabilizing layer 14 consists of an NiFe thin layer having laminated anti-ferromagnetic layers such as NiMn or NiO layers. The anisotropic direction of the domain stabilizing layer 14 is parallel to the direction of the sense current J and the direction of magnetization Ms of the domain stabilizing layer 14 is the same as that of the sense current J.

The function of the MR sensing element 10 will now be described. The magnetization M of the sensing pattern 12 is oriented at approximately 45° to the sense current J by a bias field (not shown). When an external field Hs is applied, the magnetization M of the sensing pattern 12 rotates from the stable direction. Since the sending pattern 12 is circular, the magnitude of a demagnetizing field is almost constant as the rotation angle of the magnetization M changes. As a result, as shown in FIG. 2, the change rate of resistance of the sensing pattern 12 is substantially constant irrespectively of the direction of the external field Hs. Thus, the good linear response characteristics of the resistance of the sensing pattern 12 to the magnetic filed is obtained.

Figure 3:
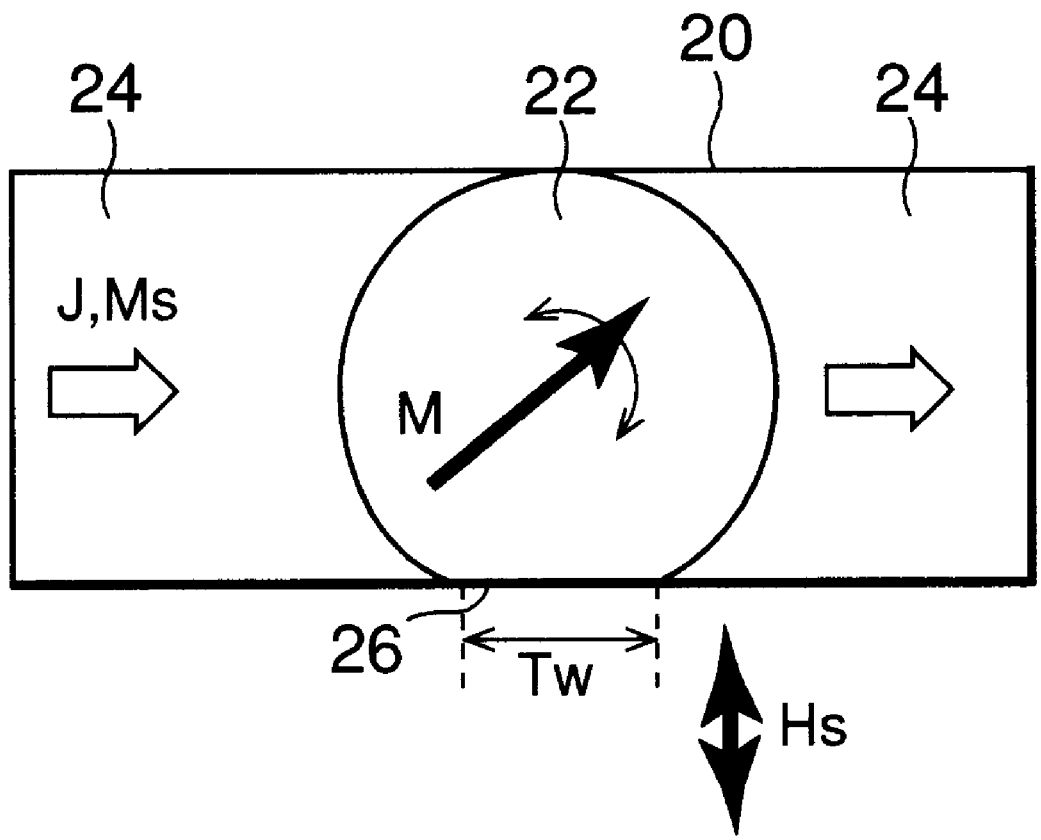
FIG. 3 is a plan view showing the constitution of an MR sensing element of a second embodiment according to the present invention.

FIG. 3 is a plan view showing an MR sensing element of a second embodiment according to the present invention. Description will be given to the second embodiment with reference to FIG. 3.

In this embodiment, an MR sensing element 20 comprises a sensing pattern 22 consisting of a magnetoresistive layer whose resistance changes in accordance with the direction of magnetization M. The sensing pattern 22 is formed to be of circular shape. On both sides of the sensing pattern 22, domain stabilizing layers 24, 24 are provided for making the magnetic domain structure of the sensing pattern 22 a single domain structure. The MR sensing element 20 of this embodiment is the same as the MR sensing element 10 of the first embodiment except that the length of a chord 26 is longer than that of the chord 16 to Tw=2.5 $\mu$m. The chord 26 is a section at which an external field Hs is effectively detected. In a magnetic head using the MR sensing element 20, the chord 26 serves as a parameter for determining a trackwidth which is almost equal to the length Tw. Thus, the length of the chord 26 can be changed in accordance with, for example, a trackwidth.

Figure 4:
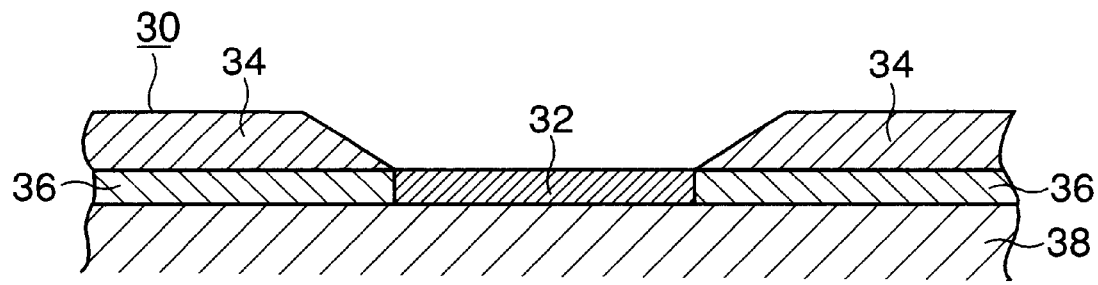
FIG. 4 is an end view showing an MR sensing element of a third embodiment according to the present invention.

FIG. 4 is an end view showing the constitution of an MR sensing element of a third embodiment according to the present invention. Description will be given to the third embodiment with reference to FIG. 4.

In this embodiment, an MR sensing element 30 comprises a sensing pattern 32 consisting of a magnetoresistive layer whose resistance changes in accordance with the direction of magnetization M, and an electrode layer 34 for applying a sense current J to the sensing pattern 32. The sensing pattern 32 extends in a direction perpendicular to FIG. 4 and is formed to be of circular shape. On both sides of the sensing pattern 32, domain stabilizing layers 36, 36 are provided for making the magnetic domain structure a single domain. The The domain stabilizing layer 36 is a permanent magnetic thin layer made of a permanent magnetic material. The permanent magnetic thin layer consists of a CoCrPt alloy layer having a thickness of about 15 nm and is provided on a substrate 38 by a sputtering technique. The permanent magnetic thin layer has a coercive force Hc of 500 to 1000 Oe. The reason the coercive force is set Hc>500 Oe is that it is necessary for the coercive force of the permanent magnetic thin layer to be made sufficiently greater than that of the magnetic field of an external signal, which is typically about 100 Oe. The electrode layer 34 is a metal layer having a thickness of 300 nm and is provided on the domain stabilizing layer 36 by a sputtering technique. The remaining conditions is the same as that in the first embodiment described before.

Figure 5:
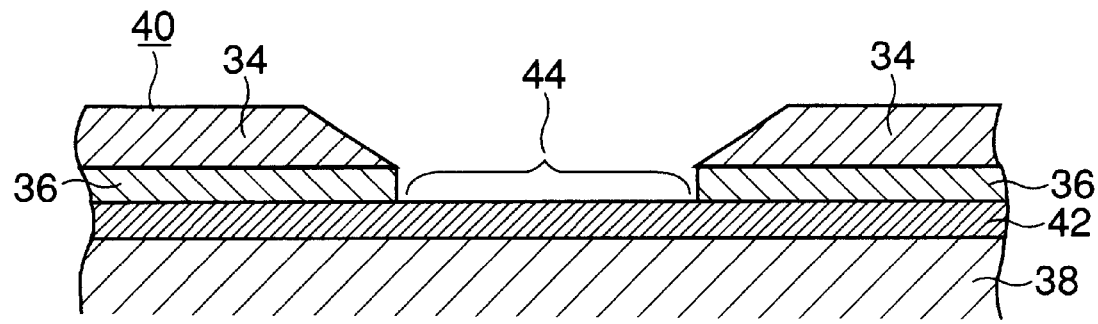
FIG. 5 is an end view showing an MR sensing element of a fourth embodiment according to the present invention.

FIG. 5 is an end view showing the constitution of an MR sensing element of a fourth embodiment according to the present invention. Description will be given to the fourth embodiment with reference to FIG. 5. Elements having the same reference numerals as those in FIG. 4 will not be described here.

In this embodiment, an MR sensing element 40 comprises a sensing pattern 44 consisting of magnetoresistive layer 42 whose resistance changes in accordance with the direction of magnetization M. On both sides of the sensing pattern 44, domain stabilizing layers 36, 36 are provided for making the magnetic domain structure of the sensing pattern 44 a single magnetic domain. The sensing pattern 44 extends in a direction perpendicular to the view of FIG. 5 and is formed to be of circular shape, depending on the shape of the domain stabilizing layer 36.

The magnetoresistive layer 42 is an NiFe alloy thin layer and is continuously provided on a substrate 38 while contacting with the domain stabilizing layer 36. The domain stabilizing layer 36 is an anti-ferromagnetic NiMn layer and is formed to have a thickness of 30 nm by a sputtering technique. The uni-anisotropic direction of the layer 36 is parallel to that of the sense current J. Since the exchange field is generated at the interface between the domain stabilizing layer 36 and the magnetoresistive layer 42, the magnetization of the magnetoresistive layer 42 is fixed to the uni-anisotropic direction of the domain stabilizing layer 36. Due to this, an effective magnetic field is generated in the MR sensing element 40 in this direction, to thereby make the magnetic domain structure of the magnetoresistive layer 42 a single magnetic domain. The same advantage can be obtained if the domain stabilizing layer 36 is formed of a ferrimagnetic thin layer such as a GdFe layer.

Figure 6:
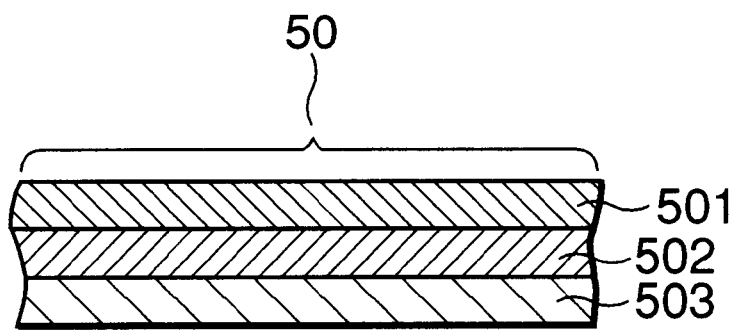
FIG. 6 is a cross-sectional view showing an MR sensing element of a fifth embodiment according to the present invention.

FIG. 6 is a cross-sectional view showing the constitution of an MR sensing element of a fifth embodiment according to the present invention. Description will be given to the fifth embodiment with reference to FIG. 6.

In this embodiment, a sensing pattern 50 is of three-layer structure consisting of an MR thin layer 501, a nonmagnetic layer 502 and a bias field application layer 503. The bias field application layer 503 is a soft magnetic sputtered layer such as CiZrMo layer. The layer 503 is provided for obtaining the linear response characteristic of the sensing element to the magnetic field. The MR thin layer 501 serving as a sensing section is an NiFe sputtered layer having a thickness of 20 nm. The MR thin layer 501 is provided on the bias field application layer 503 through the nonmagnetic layer 502 of a Ti thin layer having a thickness of 5 nm so as to orient the magnetization M at 45° to the longitudinal direction of the layer. The remaining constitution is the same as that described in the embodiments 1 through 5.

Figure 7:
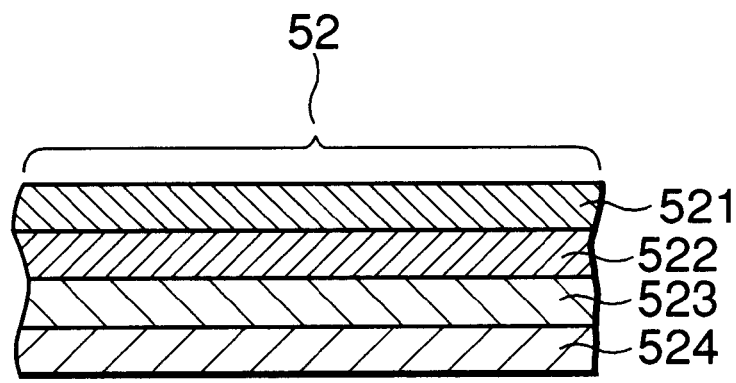
FIG. 7 is a cross-sectional view showing an MR sensing element of a sixth embodiment according to the present invention.

FIG. 7 is a cross-sectional view showing the structure of an MR sensing element of a sixth embodiment according to the present invention. Description will be given to the sixth embodiment with reference to FIG. 7.

In this embodiment, a sensing pattern 52 is of a four-layer structure consisting of a magnetization rotating layer 521, a nonmagnetic conductive layer 522, a fixed magnetization layer 523 and a magnetization fixing layer 524. This structure is a so-called spin valve structure. The magnetization fixing layer 524 consists of an NiMn anti-ferromagnetic layer. The fixed magnetization layer 523 consists of a Co layer for generating fixed magnetization. The nonmagnetic conductive layer 522 consists of a Cu thin layer. The magnetization rotating layer 521 consists of a soft magnetic NiFe thin layer in which a magnetic field freely rotates in accordance with the magnetic field of a recorded signal. The remaining structure is the same as that described in the embodiments 1 through 5.

Figure 8:
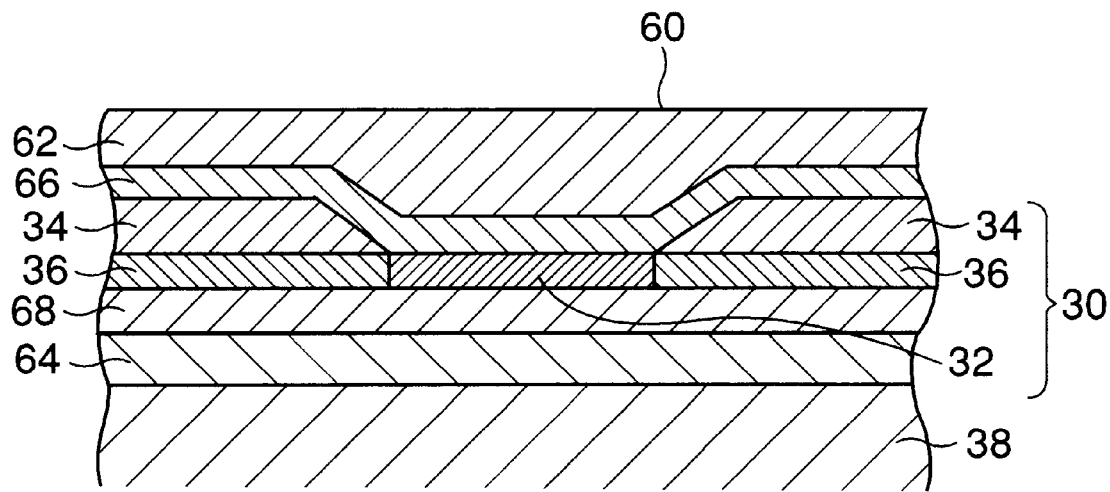
FIG. 8 is a cross-sectional view showing the constitution of a magnetic head of the first embodiment according to the present invention.

FIG. 8 is a cross-sectional view showing a layer structure of a magnetic head of the first embodiment according to the present invention. Description thereto will be given with reference to FIG. 8. Elements having the same reference numerals as those in FIG. 4 will not be described here.

As shown in FIG. 8, a magnetic head 60 has a structure that an MR sensing element 30 is put between soft magnetic layers 62 and 64 through nonmagnetic insulating layers 66 and 68 in order to improve the reproduction resolution of signal information. The soft magnetic layers 62 and 64 are magnetic shields each consisting of an NiFe thin layer having a thickness of 2 μm. The nonmangetic insulating layers 66 and 68 are gap layers. According to the magnetic head 60, when the nonmagnetic insulating layers 66 and 68 have a thickness of 100 nm, reproduced pattern density shows a resolution of not less than 130 kb per inch.

Figure 9:
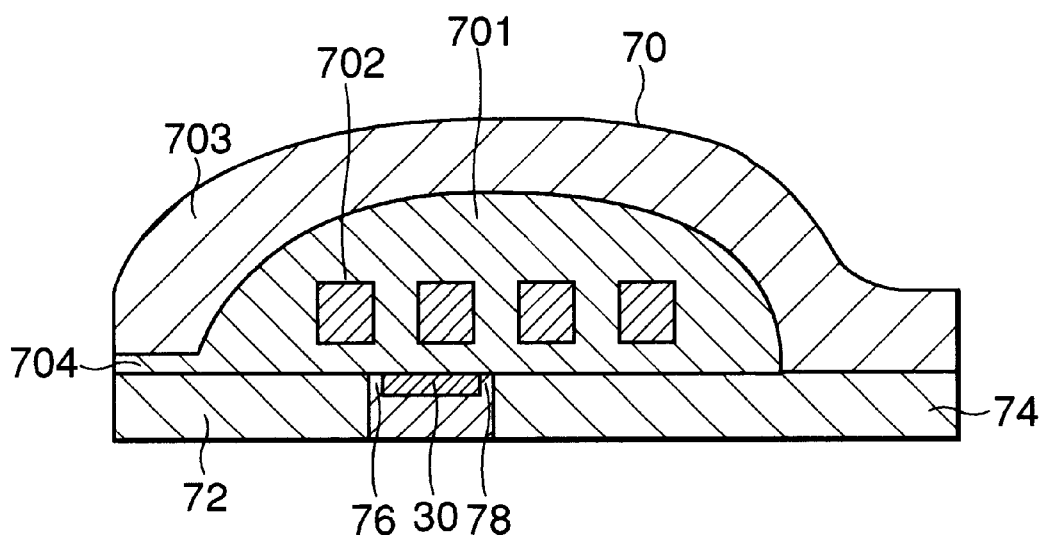
FIG. 9 is a cross-sectional view showing the constitution of a magnetic head of the second embodiment according to the present invention.
Figure 10:
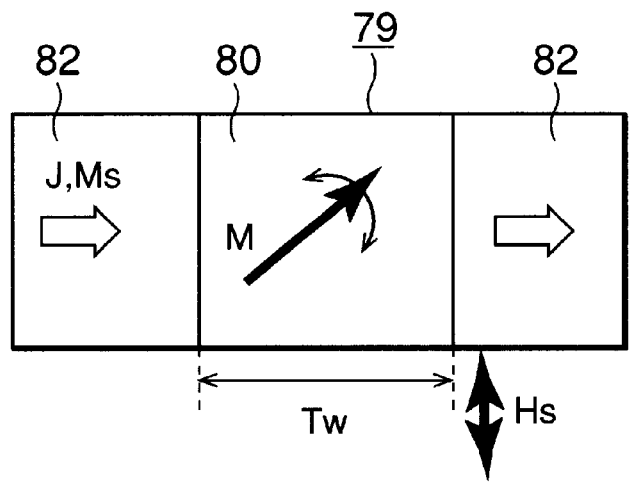
FIG. 10 is a plan view showing the constitution of the conventional MR sensing element.
Figure 11:
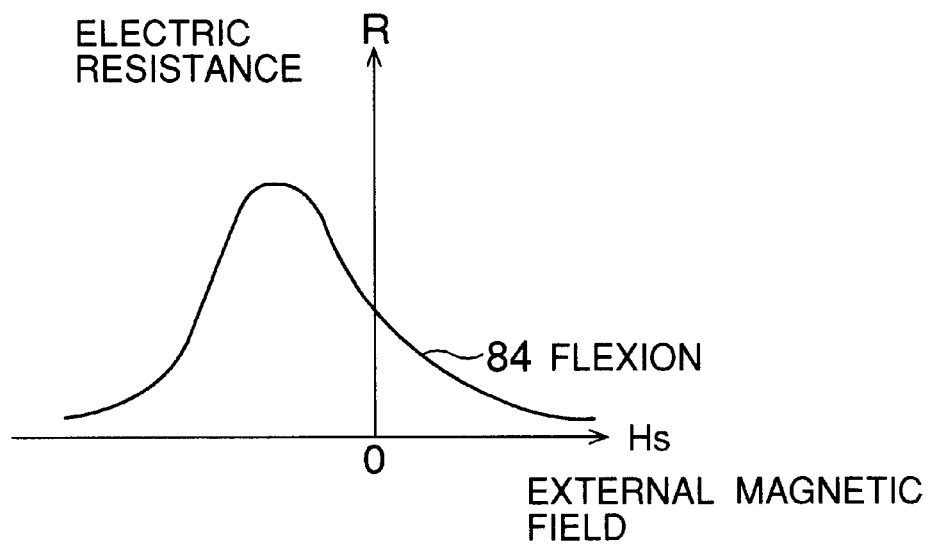
FIG. 11 is a graph showing the magnetoresistance charateristics of the conventional MR sensing element shown in FIG. 10.

FIG. 9 is a cross-sectional view showing a layer structure of a magnetic head of the second embodiment according to the present invention. Description thereto will be given with reference to FIG. 9. Elements having the same reference numerals as those in FIG. 4 will not be described here.

As shown in FIG. 9, a magnetic head 70 has a structure that an MR sensing element 30 is put between soft magnetic layers 72 and 74, serving as part of a yoke, through nonmagnetic insulating layers 76 and 78. The magnetic head 70 is a yoke-type magnetoresistance magnetic head. The head 70 is provided with a nonmagnetic insulating layer 701, a coil conductive layer 702, a soft magnetic layer 703, a write gap 704 and the like. According to the magnetic head 70, even if the head 70 and a magnetic recording medium move slidably to each other, the sliding portion of the head 70 is the write gap 704 and the MR sensing element 30 comes in no direct contact with the magnetic recording medium, thus making it possible to reduce resultant noise to the minimum.

The MR sensing element according to the present invention has a sensing element formed to be of circular shape. Due to this, the demagnetic field within the sensing pattern can be made almost constant with respect to the direction of magnetization and the linear response characteristics of resistance changes to the magnetic field can be thereby improved. Moreover, the magnetic head according to the present invention uses the MR sensing element according to the present invention. Due to this, the improved symmetric property of reproduced waveforms can be obtained and a highly reliable magnetic recording apparatus can be thereby realized.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A magnetoresistive sensing element comprising:
   a sensing pattern consisting of a magnetoresistive layer whose resistance changes in accordance with a direction of magnetization; and
   an electrode layer for applying a sense current to said sensing pattern, wherein
      said sensing pattern is formed to be of substantially circular shape.

2. The magnetoresistive sensing element according to claim 1, further comprising a domain stabilizing layer for making a magnetic domain structure of said sensing pattern a single magnetic domain, wherein
   said domain stabilizing layer is provided on each side of said sensing pattern, and
   said electrode layer is provided on said domain stabilizing layer.

3. The magnetoresistive sensing element according to claim 2, wherein said domain stabilizing layer comprises at least one of an anti-ferromagnetic layer and a ferrimagnetic layer.

4. The magnetoresistive sensing element according to claim 2, wherein said domain stabilizing layer comprises at least one of NiMn, NiO and GdFe.

5. The magnetoresistive sensing element according to claim 2, wherein said domain stabilizing layer is a permanent magnetic thin layer made of a permanent magnetic material.

6. The magnetoresistive sensing element according to claim 5, wherein said permanent magnetic material is a CoCrPt alloy layer.

7. The magnetoresistive sensing element according to claim 5, wherein said permanent magnetic thin layer has a coercive force of not less than 500 Oe.

8. The magnetoresistive sensing element according to claim 1 or 2, wherein said sensing pattern is of a laminate structure consisting of a soft magnetic layer, a nonmagnetic layer and a magnetoresistive layer in due order.

9. The magnetoresistive sensing element according to claim 1 or 2, wherein said sensing pattern is of a laminate structure consisting of a magnetization fixing layer, a fixed magnetization layer, a nonmagnetic conductive layer and a soft magnetic layer in due order.

10. A magnetic head comprising:
   a first soft magnetic layer;
   a second soft magnetic layer;
   a nonmagnetic insulating layer; and
   a magnetoresistive sensing element according to claim 1 or 2 put between said first and second soft magnetic layers through said nonmagnetic insulating layer.

* * * * *